(12) United States Patent
Bukary

(10) Patent No.: US 8,732,696 B2
(45) Date of Patent: May 20, 2014

(54) ANALYTIC APPLICATION MODEL AND MARKETPLACE

(75) Inventor: Roman Bukary, San Francisco, CA (US)

(73) Assignee: SAP Aktiengesellschaft, Walldorf (DE)

( * ) Notice: Subject to any disclaimer, the term of this patent is extended or adjusted under 35 U.S.C. 154(b) by 1487 days.

(21) Appl. No.: 10/956,961

(22) Filed: Sep. 30, 2004

(65) Prior Publication Data

US 2006/0074880 A1 Apr. 6, 2006

(51) Int. Cl.
*G06F 9/445* (2006.01)

(52) U.S. Cl.
USPC .......... 717/178; 717/100; 717/168; 717/174; 707/706; 707/736; 707/758; 705/7.11

(58) Field of Classification Search
None
See application file for complete search history.

(56) References Cited

U.S. PATENT DOCUMENTS

| | | | | |
|---|---|---|---|---|
| 5,548,506 A * | 8/1996 | Srinivasan | .................... | 705/7.15 |
| 5,692,181 A * | 11/1997 | Anand et al. | .................. | 707/102 |
| 5,835,911 A * | 11/1998 | Nakagawa et al. | ........... | 707/203 |
| 6,237,020 B1 * | 5/2001 | Leymann et al. | ............. | 709/201 |
| 6,363,282 B1 * | 3/2002 | Nichols et al. | .................. | 607/30 |
| 6,367,073 B2 * | 4/2002 | Elledge | .......................... | 717/178 |
| 6,505,342 B1 * | 1/2003 | Hartmann et al. | ............ | 717/104 |
| 6,574,729 B1 * | 6/2003 | Fink et al. | ........................... | 713/1 |
| 6,578,199 B1 * | 6/2003 | Tsou et al. | .................... | 717/178 |
| 6,598,090 B2 * | 7/2003 | Champlin | ..................... | 709/244 |
| 6,615,405 B1 * | 9/2003 | Goldman et al. | ............. | 717/174 |
| 6,636,860 B2 * | 10/2003 | Vishnubhotla | ................ | 707/100 |
| 6,678,888 B1 * | 1/2004 | Sakanishi | ...................... | 717/172 |
| 6,816,882 B1 * | 11/2004 | Conner et al. | ................. | 709/203 |
| 6,853,978 B2 * | 2/2005 | Forth et al. | ........................ | 705/26 |
| 6,954,757 B2 * | 10/2005 | Zargham et al. | .............. | 707/101 |
| 6,959,285 B2 * | 10/2005 | Stefanik et al. | .................. | 705/26 |
| 6,966,487 B1 * | 11/2005 | Somers et al. | ................ | 235/379 |
| 6,970,882 B2 * | 11/2005 | Yao et al. | ....................... | 707/102 |
| 7,080,066 B1 * | 7/2006 | Scheurich et al. | .................. | 707/3 |
| 7,117,215 B1 * | 10/2006 | Kanchwalla et al. | ......... | 707/100 |
| 7,162,643 B1 * | 1/2007 | Sankaran et al. | ............. | 713/189 |
| 7,174,342 B1 * | 2/2007 | Scheurich et al. | ............ | 707/102 |
| 7,203,745 B2 * | 4/2007 | Sheehy et al. | ................ | 709/223 |
| 7,272,575 B2 * | 9/2007 | Vega | ................................ | 705/27 |
| 2001/0039655 A1 * | 11/2001 | Elledge | ............................ | 717/11 |
| 2002/0026388 A1 * | 2/2002 | Roebuck | .......................... | 705/27 |
| 2002/0196279 A1 * | 12/2002 | Bloomfield et al. | .......... | 345/749 |
| 2002/0198889 A1 * | 12/2002 | Vishnubhotla | ................ | 707/101 |
| 2002/0199117 A1 * | 12/2002 | Nagaya | ......................... | 713/201 |

(Continued)

OTHER PUBLICATIONS

Steven Newhouse et al, "Computational Communities: a Market Place for Federated Resources", Department of Computing Imperial College of Science, Technology and Medicine, UK, 2001.*

(Continued)

*Primary Examiner* — Hung Le
(74) *Attorney, Agent, or Firm* — Blakely, Sokoloff, Taylor & Zafman

(57) ABSTRACT

One embodiment of the invention is a technique to create and provide an analytic marketplace. A single file definition is created for a plurality of applications and sub-components of a complete analytic application. A request for an analytic application is received from a user at an analytic marketplace in a user session. The analytic marketplace searches for an application that matches the request using the single file and generates a search result. The request is responded according to the search result and then an appropriate analytic application is presented to the user.

45 Claims, 6 Drawing Sheets

(56) References Cited

U.S. PATENT DOCUMENTS

| | | | |
|---|---|---|---|
| 2003/0001907 A1* | 1/2003 | Bergsten et al. | 345/853 |
| 2004/0006586 A1* | 1/2004 | Melchione et al. | 709/201 |
| 2004/0128645 A1* | 7/2004 | Srivastava | 717/101 |
| 2004/0148600 A1* | 7/2004 | Hoshino | 717/174 |
| 2004/0153538 A1* | 8/2004 | Champlin | 709/223 |
| 2004/0192440 A1* | 9/2004 | Evans et al. | 463/30 |
| 2005/0022178 A1* | 1/2005 | Ghafoor et al. | 717/171 |
| 2006/0161640 A1* | 7/2006 | Terasawa | 709/219 |
| 2006/0293942 A1* | 12/2006 | Chaddha et al. | 705/8 |
| 2008/0071640 A1* | 3/2008 | Nguyen | 705/26 |

OTHER PUBLICATIONS

Tony Bartoletti et al, "Secure Software Distribution System", Computer Security Technology Center, Lawrence Livermore National Laboratory, CA, 1997.*

* cited by examiner

ANALYTIC APPLICATION MODEL AND MARKETPLACE

BACKGROUND

1. Field of the Invention

Embodiments of the invention relate to the field of electronic commerce, and more specifically, to analytic applications.

2. Description of Related Art

Business analytics include software tools and applications for tracking, analyzing, and modeling data in support of decision-making processes or in support of guiding specific actions based on analytic models and analytic applications, such guidance may be done automatically or with human (manual) interaction. Business analytics are typically used, but are not necessarily limited, to support business enterprise systems such as Enterprise Resource Planning (ERP), Customer Relationship Management (CRM), Supply Chain Management (SCM), etc. Applications that may benefit from business analytics include data warehousing, data mining, business intelligence, and other electronic commerce (e-commerce) applications.

Analytic applications involve some concept of data integration from multiple data sources, and a user interface consisting of a dashboard, query, report, alert (visual, graphical, auditory, automated, etc.). An analytic application typically includes data analysis, calculation, processing, and providing some representation to the user. Data are received from multiple sources (such as ERP, mainframes, websites, external data providers), integrated into a common model, processed, and analyzed to produce a result to be delivered to the user which then drives specific action or insight. In a typical business software environment, there may be a multitude of analytic applications designed to support specific applications according to some set of requirements or standards. A user often faces with a difficult task of selecting an analytic application or locating an appropriate analytic model (or report) that is suitable for his or her requirements.

SUMMARY OF INVENTION

One embodiment of the invention is a technique to create and provide an analytic marketplace. A single file definition is created for a plurality of applications and sub-components of a complete analytic application. A request for an analytic application is received from a user at an analytic marketplace in a user session. The analytic marketplace searches for an application that matches the request using the single file and generates a search result. The request is responded according to the search result and then an appropriate analytic application is presented to the user.

One aspect of the invention is an analytic marketplace that distributes, populates, and updates applications for use by user of business software. The analytic marketplace searches for a requested application in a repository of existing applications, a knowledge base of other vendor applications, or an alternate application database containing similar applications.

Another aspect of the invention is a single file definition that provides metadata definitions for applications in a standardized, modular, and complete representation. The single file definition provides the basic metadata definitions to describe or characterize an application or a model. It provides metadata information as well as search, utilization, dependencies, activities pre-requisites, associated reports and user interface elements as well as information on how to locate the analytic applications requested by the user.

BRIEF DESCRIPTION OF THE DRAWINGS

Embodiments of the invention may best be understood by referring to the following description and accompanying drawings that are used to illustrate embodiments of the invention. In the drawings.

DESCRIPTION OF THE INVENTION

Figure 1:
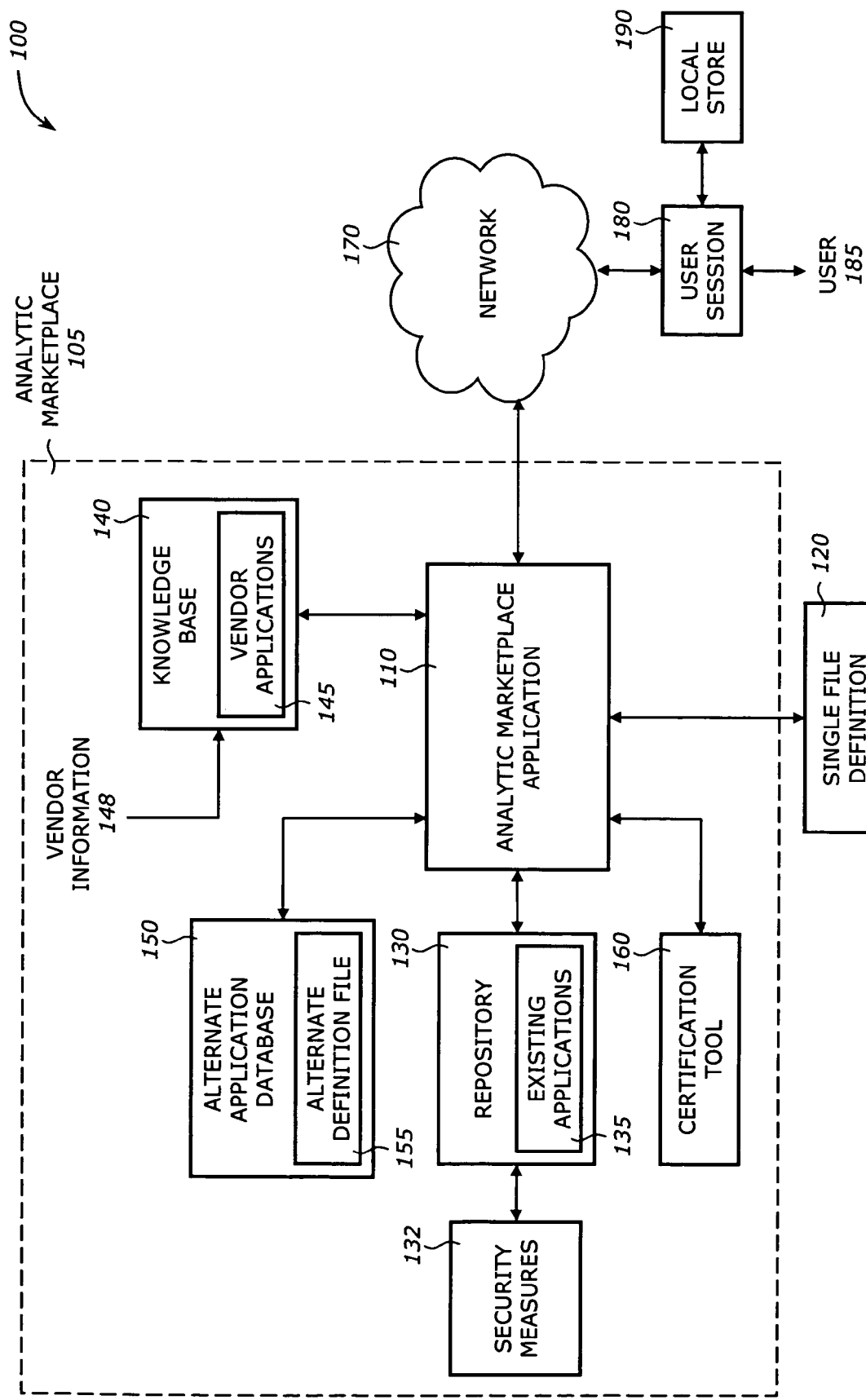
FIG. 1 is a diagram illustrating a system in which one embodiment of the invention can be practiced.

One embodiment of the invention is a technique to create and provide an analytic marketplace. A single file definition is created for a plurality of applications and sub-components of a complete analytic application. A request for an analytic application is received from a user at an analytic marketplace in a user session. The analytic marketplace searches for an application that matches the request using the single file and generates a search result. The request is responded according to the search result and then an appropriate analytic application is presented to the user.

In the following description, numerous specific details are set forth. However, it is understood that embodiments of the invention may be practiced without these specific details. In other instances, well-known circuits, structures, and techniques have not been shown in order not to obscure the understanding of this description.

Elements of one embodiment of the invention may be implemented by hardware, software, firmware, microcode, or any combination thereof. When implemented in software, firmware, or microcode, the elements of the embodiment of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the machine accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operation described in the following. The term "data" here refers to any type of information that is encoded for machine-readable purposes. Therefore, it may include program, code, data, file, etc.

All or part of an embodiment of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

It is noted that an embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

One aspect of the invention is an analytic marketplace that distributes, populates, and updates applications for use by user of business software. Another aspect of the invention is a single file definition that provides metadata definitions for applications in a standardized, modular, and complete representation.

FIG. 1 is a diagram illustrating a system 100 in which one embodiment of the invention can be practiced. The system 100 includes an analytic marketplace 105, a single file definition 120, a network 170, a user session 180, and a user 185.

The analytic marketplace 105 is a center for distributing, populating, and updating applications for use by users of business software developed and distributed by a software manufacturer. It provides an ecosystem development of analytic applications for the entire user market. By moving away from monolithic applications that are updated only occasionally to a dynamic, continuously updated environment with on-demand delivery of the applications, the analytic marketplace 105 provides an efficient and versatile centralized location to service users. The analytic marketplace 105 may have a business registry on the Web using a method analogous to Universal Descriptions, Discovery and Integration (UDDI). The analytic marketplace 105 includes an analytic marketplace application 110, a repository 130, security measures 132, a knowledge base 140, an alternate application database 150, and a certification tool 160.

The analytic marketplace 105 may be developed using any suitable platform or environment. It may use any language that supports dynamic interactive user interface such as Java, C++, C programming language, JavaServer Pages (JSP) technology, Java 2 Enterprise Edition (J2EE), Hypertext Markup Language (HTML), Web-based platform, etc. It may be developed as part of or to support other business software suites such as SAP NetWeaver, SAP R/3, SAP xRPM, SPA xPA, mySAP ERP, mySAP PLM, mySAP SRA, mySAP SCM, mySAP CRM, and other products provided by SAP AG. It may be run on a server using one or more processors or machines. The processor executes program(s) or runs application(s) from a memory. The programs or applications may be available in a machine accessible medium. The processor, or machine, executes instructions in the program or application to perform operations described as follows.

The single file definition 120 provides the basic metadata definitions to describe or characterize an application or a model. It provides metadata information as well as search, utilization, dependencies, activities pre-requisites, associated reports and user interface elements as well as information on how to locate the analytic applications requested by the user 185. It contains information about what data sources to download, what operations to be performed, how to present the data, for example, into a portal or a device-independent environment. It is portable, extensible, and self-contained as well as containing a check-sum capability to ensure complete data model, along with the associated metadata, transfer upon request.

The repository 130 stores existing applications 135 or models developed by the software manufacturer. The existing applications or models 135 include analytic applications or models that have been developed and accumulated over the years to support several business solutions such as enterprise resource planning (ERP), customer relationship management (CRM), product life cycle management, supply chain management (SCM), supplier relationship management (SRM), and enterprise portal. The repository 130 may have security settings provided by security measures 132. The security measures 132 provides secure protection for sensitive and/or confidential applications for individual applications. Examples of these security measures include encryption, decryption, passwords, authentication, role-based access, reverse IP look-up, as well as utilization of master licensing or access resources such as a license server, etc.

The knowledge base 140 stores information on vendor applications 145. The vendor applications 145 are provided or developed by vendors who are partners of the software manufacturer. The vendors provide vendor information 148 such as product description, and vendor location and contact information. The knowledge base 140 may also contain a recor of users or organization that accessed the applications from the analytic marketplace.

The alternate application database 150 stores applications that have attributes similar to the attributes requested by the user 185. It contains an alternate file definition 155 to be delivered to the user 185 if a similar application may be found.

The certification tool 160 is a tool to certify the completeness of the single file definition 120 and leverages file definition 120's check-sum utilities. It may be developed by the software manufacturer or its partner and may be provided to the user 185 to verify his or her analytic application. The user 185 may use the certification tool to diagnose or identify problem areas such as missing items in his or her analytic application. For example, upon verifying that analytic application is complete, the user 185 may discover that the problem lies in his or her own environment or in some pre-existing module that needs to be modified.

The network 170 is any network that provides the user 185 access to the analytic marketplace 110. It may be the Internet, an intranet, an extranet, a local area network (LAN), a wide area network (WAN), a wireless network, a wireless fidelity (Wi-Fi) network, a mobile network, or any other networks. The network 120 may use any suitable protocol, such as Transmission Control Protocol/Internet Protocol (TCP/IP), Asynchronous Transfer Mode (ATM), Frame Relay (FR), Point-to-point Protocol (PPP), Systems Network Architecture (SAN), Voice over Internet Protocol (VoIP), or any other protocol, and any combination thereof.

The user session 180 is an application launched by the user 185 to access the analytic marketplace 105. The user session 180 provides interactions between the user 185 and the analytic marketplace 105. It may employ any suitable methods such as web service, hypertext transfer protocol (HTTP) request, or a proprietary applications program interface (API) which may be invoked manually, programatically, rule-based, as an exception condition, as a sub-routine break, or otherwise.

In a typical scenario, the user 185 logs on the user session 180 to connect to the analytic marketplace 105, the user 185 searches for a specific analytic application which may contain the necessary KPI, metric, report, model, or analysis. Based on this search, session 180 initiates a bi-directional communication with marketplace 105 which may be synchronous or asynchronous requesting an analytic application having a set of required attributes. The analytic marketplace application 110 receives the request and searches for an application that matches the required attributes using the single file definition 120—in effect, the search is done on the complete metadata space of marketplace 105 to which the user 185 or their respective organization (within bounds of security provisions) has authorized access. The analytic marketplace application 110 searches for the application in the repository 130, the knowledge base 150, and the alternate application database 150. If an application is found, the analytic marketplace application 110 delivers it to the user for downloading to the local store 190 as a local copy and creates a permanent log of user having found, selected, and accessed said application for future instances in case this application is updated, modified, obsoleted, or otherwise altered.

Figure 2:
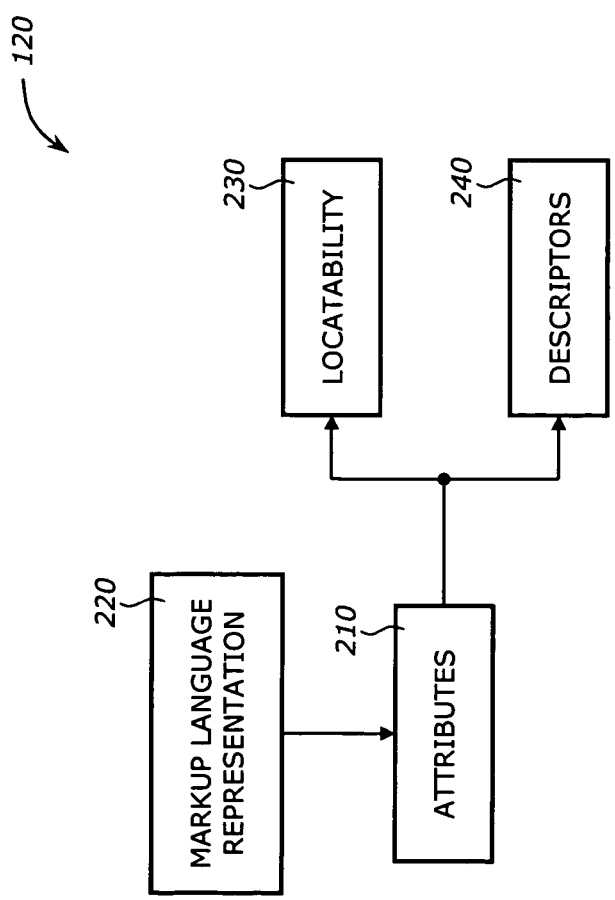
FIG. 2 is a diagram illustrating a single file definition according to one embodiment of the invention.

FIG. 2 is a diagram illustrating the single file definition 120 according to one embodiment of the invention. The single file definition 120 includes a markup language representation 210 and attributes 220 some of which is stored within specific data structures and some of which is stored in a metadata repository.

The markup language representation 210 is a document file that represents the definitions of the analytic applications. It may be composed by an extensible markup language (XML), a standard generalized markup language (SGML), or any other language that provides metadata definition capability with extensibility, flexibility, and adaptable information identification. It may also be compatible with XML Metadata Interchange (XMI), or Common Warehouse Metamodel (CWM). The markup language representation 210 allows any application provider to deliver to the analytic marketplace a well-defined file that can be installed on any machine under any environment as long as the required components are present. It provides standardization, extensibility, modularity, and completeness. Standardization permit vendors, including the software manufacturer of the analytic marketplace, to determine the componental modules to be built and modules belonging to others. Plug-in modules may be integrated. Any plug-in modules that perform data manipulation or processing, such as modules that perform summation, scoring, segmentation, data mining, statisical analysis, data gathering, etc., may be integrated. Extensibility provides well defined methods for extending said model to incorporate additional analytic application definitions as may be required such as unique identifiers, encryption, additional pre-requisites, activation routines, etc. Modularity provides ease in integration and leads to completeness. Completeness includes integration of all operations necessary for running an application. This includes activation of the application, retrieving data from various sources, connecting the application to a certain portal, etc.

The attributes 220 are attributes of applications. They are defined according to a standard classification as described above. They are defined in a complete representation to provide locatability 230 and descriptors 240 of the applications. The locatability 230 provides information on where to locate the application, where to retrieve data, or how to download the application. The descriptors 240 describe the application with characteristics that characterize the application.

The complete representation of the attributes may help as a troubleshooting or diagnosis agent. For example, the user may have had on-going problems in his or her own particular application environment, but did not understand the nature of the problems. By using the single file definition 120 with complete representation, the user may be able to identify the particular module or modules in his or her environment.

Figure 3:
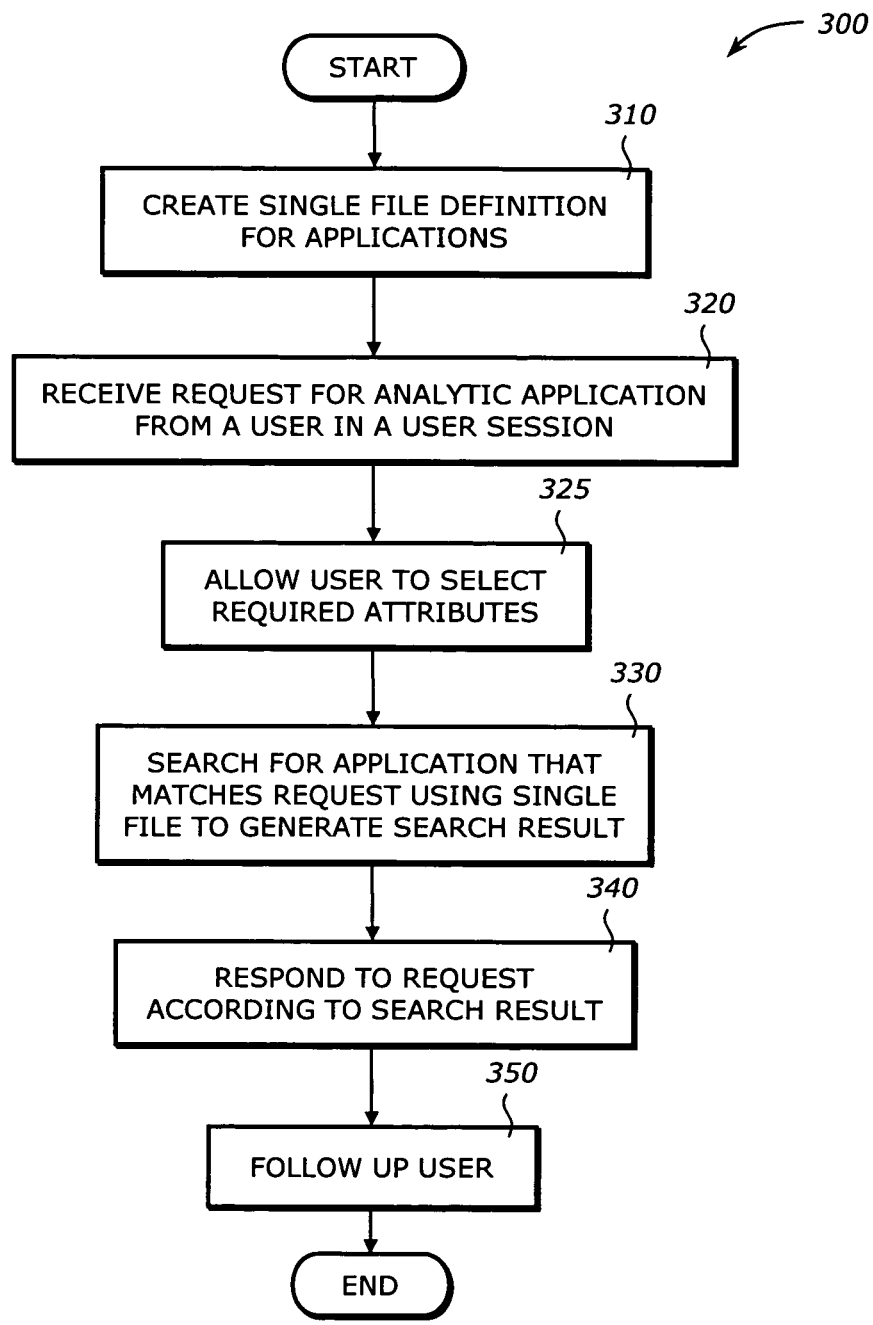
FIG. 3 is a flowchart illustrating a process to service user in analytic marketplace according to one embodiment of the invention.

FIG. 3 is a flowchart illustrating a process 300 to service users in analytic marketplace according to one embodiment of the invention. The process 300 is typically performed by the analytic marketplace 105.

Upon START, the process 300 creates a single file definition for applications that may be requested by a user (Block 310). The single file definition includes attributes of analytic applications defined according to a standard classification. The attributes correspond to a complete representation of locatability and descriptors of the applications. Next, the process 300 receives a request for an analytic application from a user in a user session (Block 320). The request is generated by allowing the user to select or specify the required attributes for the analytic application (Block 325).

Then, the process 300 searches for an application that matches the request using the single file definition to generate a search result (Block 330). Next, the process 300 responds to the user according to the search result (Block 340). Then, the process 300 follows up the user (Block 350) and is then terminated.

Figure 4:
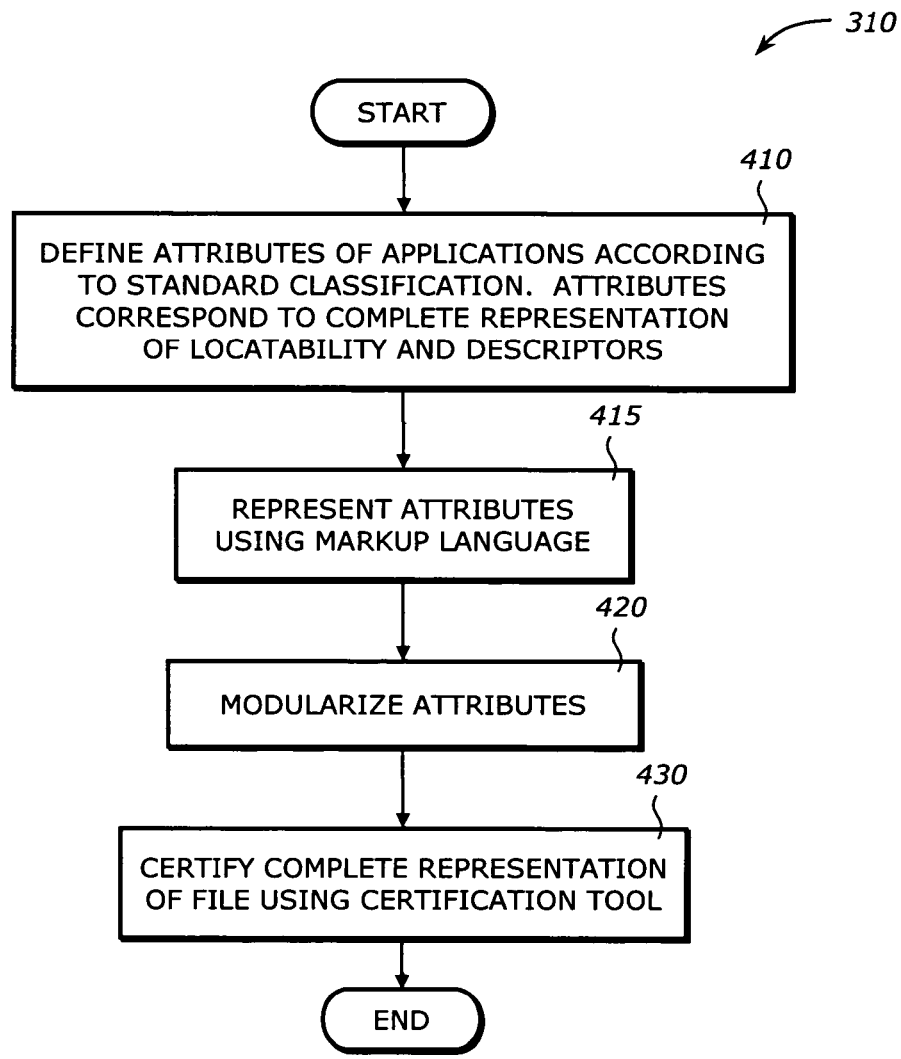
FIG. 4 is a flowchart illustrating a process to create a single file definition according to one embodiment of the invention.

FIG. 4 is a flowchart illustrating the process 310 to create a single file definition according to one embodiment of the invention.

Upon START, the process 310 defines the attributes if the applications according to a standard classification (Block 410). The attributes correspond to a complete representation of locatability and descriptors of the applications. This may be performed by representing the attributes using an extensible markup language (Block 415).

Next, the process 310 modularizes the attributes or their representation (Block 420). Then, the process 310 certifies the complete representation of the single file definition using a certification tool (Block 430) and is then terminated.

Figure 5:
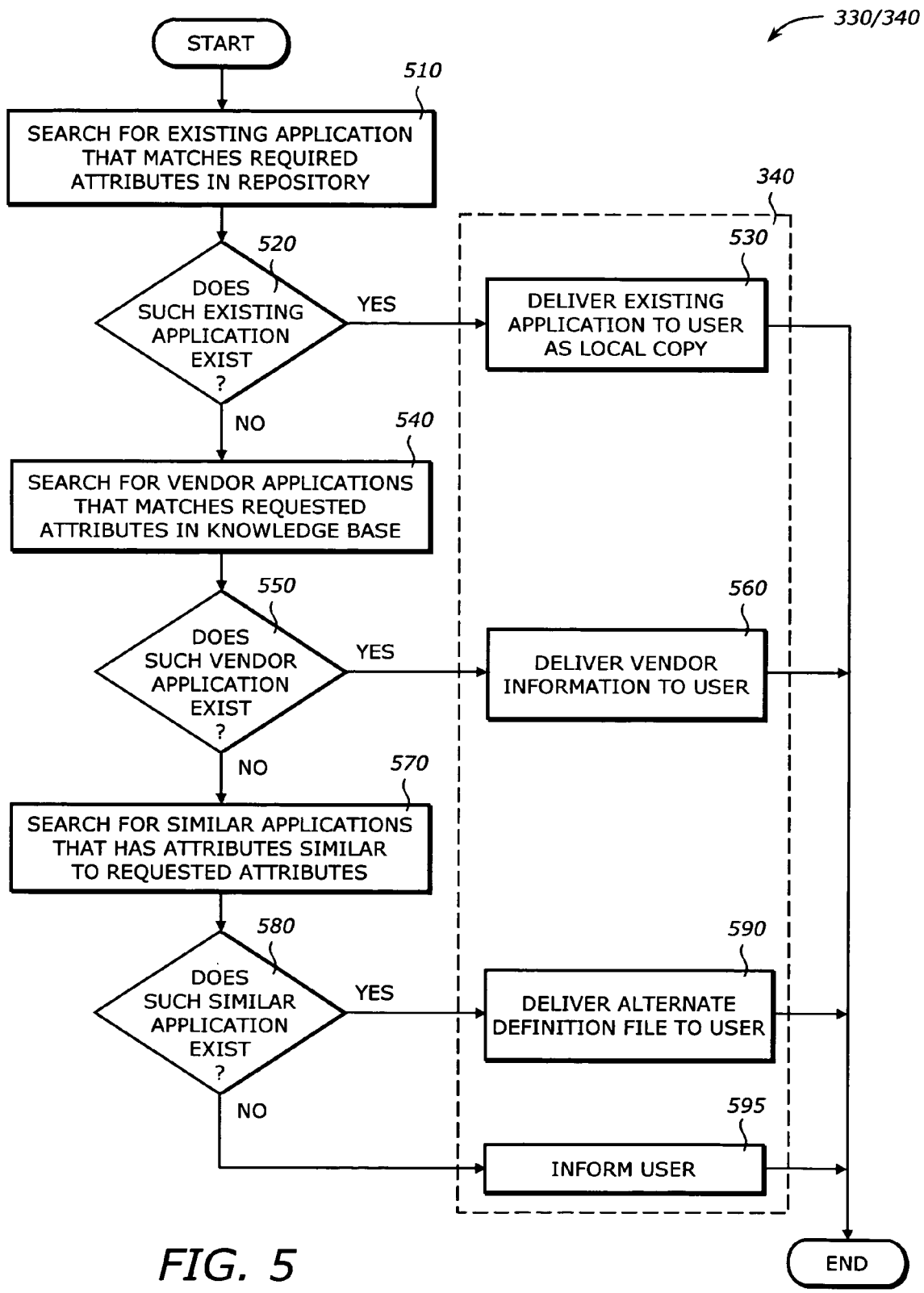
FIG. 5 is a flowchart illustrating a process to search for applications and respond to user according to one embodiment of the invention.

FIG. 5 is a flowchart illustrating the process 330/340 to search for applications and respond to user according to one embodiment of the invention.

Upon START, the process 330/340 searches for an existing application that matches the required attributes in a repository of existing applications (Block 510). Next, the process 330/340 determines if such an existing application exists (Block 520). If so, the process 330/340 delivers the existing application to the user as a local copy (Block 530) and is then terminated.

If such an existing application does not exist, the process 330/340 searches for a vendor application that matches the required attributes in a knowledge base (Block 540). Next, the process 330/340 determines if such a vendor application exist (Block 550). If so, the process 330/340 delivers the vendor information (e.g., name, contact information) associated with the vendor application to the user (Block 560) and is then terminated. Otherwise, the process 330/340 searches for a similar application that has attributes similar to the required attributes in an alternate applications database (Block 570). Then, the process 330/340 determines if such a similar application exists (Block 580). If so, the process 330/340 delivers an alternate definition file to the user (Block 590) and is then terminated. Otherwise, the process 330/340 informs the user of the search result (Block 595) and is then terminated. Note that blocks 530, 560, 590 and 595 are part of the block 340 shown in FIG. 3.

Figure 6:
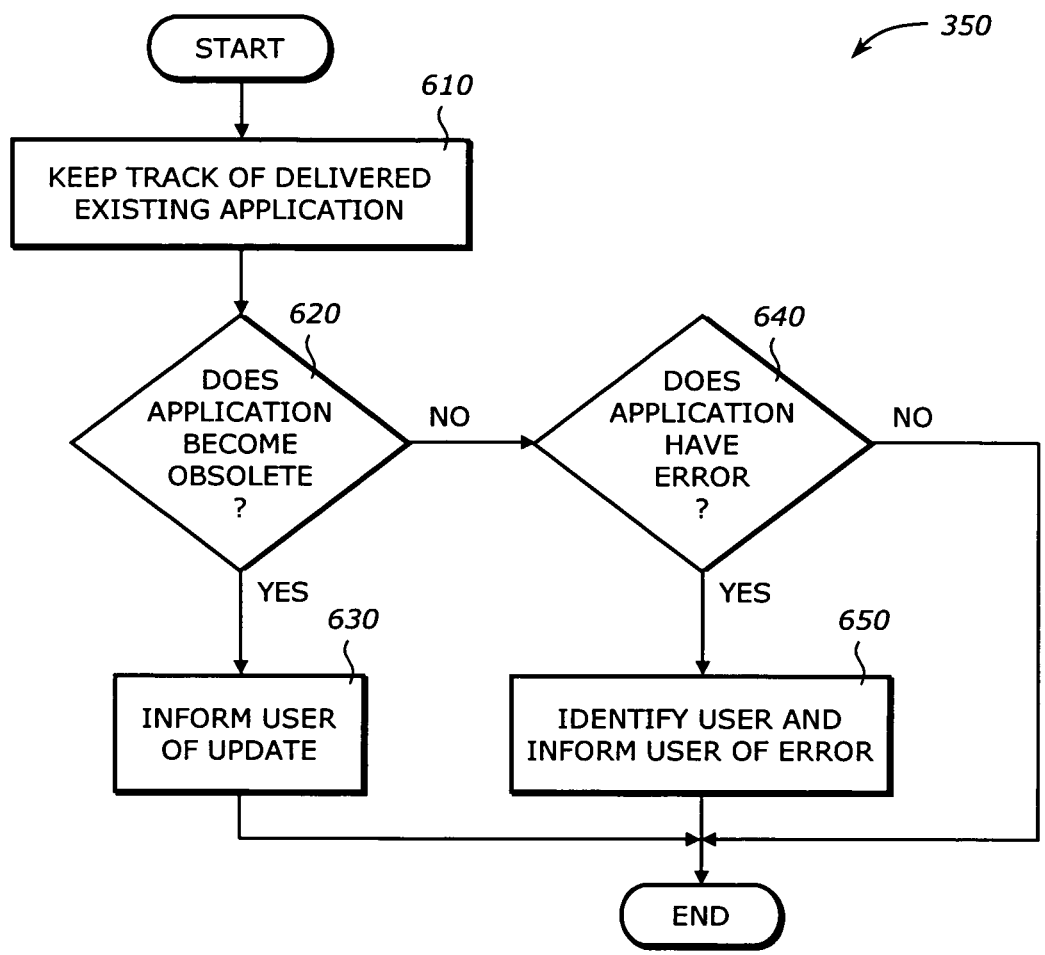
FIG. 6 is a flowchart illustrating a process to follow up according to one embodiment of the invention.

FIG. 6 is a flowchart illustrating the process 350 to follow up according to one embodiment of the invention.

Upon START, the process 350 keeps track of the delivered existing application (Block 610). This can be performed by routinely examining status or condition of the existing application in the repository. Next, the process 350 determines if the application become obsolete (Block 620). If so, the process 350 informs the user of an update (Block 630) and is then terminated. Otherwise, the process 350 determines if there is an error or a bug in the application (Block 640). If so, the process 350 identifies the user and informs the user of the error (Block 650) and is then terminated. Otherwise, the process 350 is terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. In a centralized analytic marketplace environment that provides for the distribution and updating of business software applications to users of the business software applications via a computer network, a method comprising:
   creating a single file definition having metadata to describe information about each of a plurality of business software applications to be distributed or updated by the centralized analytic marketplace environment, wherein the single file definition describes, for each of the plurality of business software applications, one or more sub-components of the business software application, pre-requisites and dependencies of the business software application, and location information for the business software application;
   receiving a request for one of the plurality of business software applications from one of a plurality of users of the centralized analytic marketplace environment via the computer network;
   searching the centralized analytic marketplace environment for a business software application within the plurality of business software applications based on the request and based further on the single file definition that describes the plurality of business software applications; and
   responding to the request according to the search result by identifying a business software application selected from the plurality of business software applications, the location information for the business software application, and pre-requisites and dependencies associated with the business software application as described by the single file definition.

2. The method of claim 1 wherein creating the single file definition comprises:
   defining attributes of the plurality of business software applications according to a standard classification, the attributes corresponding to a complete representation of locatability and descriptors of the business software applications, including the sub-components, pre-requisites, and dependencies of the business software applications; and
   modularizing the attributes to facilitate integration of operations for running the business software applications.

3. The method of claim 1 wherein the plurality of business software applications are made available to the users of the business software applications, via the centralized analytic marketplace environment, from at least one of a local business application repository of a software manufacturer and a knowledge base of third-party vendor provided business application software.

4. The method of claim 2 further comprising:
   certifying the complete representation of the single file definition using a certification tool.

5. The method of claim 4 further comprising:
   verifying the requested business software application using the certification tool at a user environment.

6. The method of claim 5 wherein receiving the request comprises:
   allowing the user to select the attributes for the business software applications.

7. The method of claim 6 wherein searching comprises:
   searching for an existing business software application that matches the selected attributes in a repository of the centralized analytic marketplace environment.

8. The method of claim 7 wherein responding comprises:
   delivering the existing business software application to the user as a local copy.

9. The method of claim 7 further comprising:
   providing a security measure to the repository.

10. The method of claim 6 wherein searching comprises:
    searching for a vendor application that matches the selected attributes in a knowledge base of the centralized analytic marketplace environment, the knowledge base including vendor information of a vendor supplying the vendor application; and
    creating a record of users or organizations accessing the business software application from the centralized analytic marketplace environment.

11. The method of claim 10 wherein responding comprises:
    delivering the vendor information to the user.

12. The method of claim 11 further comprising:
    keeping track of the delivered existing business software application;
    informing the user of an update if the delivered existing business software application becomes obsolete; and
    informing the user if the delivered existing business software application is determined to have an error.

13. The method of claim 6 wherein searching comprises:
    searching for a similar business software application that has attributes similar to the selected attributes; and
    generating an alternate definition file of the similar business software application.

14. The method of claim 13 wherein responding comprises:

delivering the alternate definition file to the user.

15. The method of claim 1 wherein receiving the request via the computer network comprises receiving the request via a user session, and wherein the user session occurs by using one of a web service, a hypertext transfer protocol (HTTP) request, and an application program interface (API).

16. An article of manufacture comprising:
a machine-accessible storage medium including data that, when accessed by a machine which operates a centralized analytic marketplace to provide for the distribution and updating of business software applications, the data causes the machine to perform operations comprising:
creating a single file definition having metadata to describe information about each of a plurality of business software applications to be distributed or updated by the centralized analytic marketplace environment, wherein the single file definition describes, for each of the plurality of business software applications, one or more sub-components of the business software application, pre-requisites and dependencies of the business software application, and location information for the business software application;
receiving a request for one of the plurality of business software applications from one of a plurality of users of the centralized analytic marketplace environment;
searching the centralized analytic marketplace environment for a business software application within the plurality of business software applications based on the request and based further on the single file definition that describes the plurality of business software applications; and
responding to the request according to the search result by identifying a business software application selected from the plurality of business software applications, the location information for the business software application, and pre-requisites and dependencies associated with the business software application as described by the single file definition.

17. The article of manufacture of claim 16 wherein creating the single file definition comprises:
defining attributes of the plurality of business software applications according to a standard classification, the attributes corresponding to a complete representation of locatability and descriptors of the business software applications, including the sub-components, pre-requisites, and dependencies of the business software applications; and
modularizing the attributes to facilitate integration of operations for running the business software applications.

18. The article of manufacture of claim 17 wherein defining the attributes comprises:
representing the attributes using an extensible markup language (XML).

19. The article of manufacture of claim 17 wherein the machine to perform further operations comprising:
certifying the complete representation of the single file definition using a certification tool.

20. The article of manufacture of claim 19 wherein the machine to perform further operations comprising:
verifying the requested business software application using the certification tool at a user environment.

21. The article of manufacture of claim 20 wherein receiving the request comprises: allowing the user to select the attributes for the business software applications.

22. The article of manufacture of claim 21 wherein the machine to perform further operations comprising:
searching for an existing business software application that matches the selected attributes in a repository of the centralized analytic marketplace.

23. The article of manufacture of claim 22 wherein the machine to perform further operations comprising:
delivering the existing business software application to the user as a local copy.

24. The article of manufacture of claim 22 wherein the machine to perform further operations comprising:
providing a security measure to the repository.

25. The article of manufacture of claim 21 wherein the machine to perform further operations comprising:
searching for a vendor business software application that matches the selected attributes in a knowledge base of the centralized analytic marketplace, the knowledge base including vendor information of a vendor supplying the vendor business software application; and
creating a record of users or organizations accessing the business software application from the centralized analytic marketplace.

26. The article of manufacture of claim 25 wherein the machine to perform further operations comprising:
delivering the vendor information to the user.

27. The article of manufacture of claim 26 wherein the machine to perform further operations comprising:
keeping track of the delivered existing business software application;
informing the user of an update if the delivered existing business software application becomes obsolete; and
informing the user if the delivered existing business software application is determined to have an error.

28. The article of manufacture of claim 16 wherein the machine to perform further operations comprising:
searching for a similar business software application that has attributes similar to the selected attributes; and
generating an alternate definition file of the similar business software application.

29. The article of manufacture of claim 28 wherein the machine to perform further operations comprising:
delivering the alternate definition file to the user.

30. The article of manufacture of claim 16 wherein receiving the request comprises receiving the request via a user session, and wherein the user session occurs by using one of a web service, a hypertext transfer protocol (HTTP) request, and an application program interface (API).

31. A system comprising:
a user logging on a user session via a network to request an analytic software application; and
a centralized analytic marketplace to provide for the distribution and updating of analytic software applications running on a server and coupled to the network wherein the centralized analytic marketplace comprises:
a single file definition having metadata to describe information about each of a plurality of analytic software applications to be distributed or updated by the centralized analytic marketplace, wherein the single file definition describes, for each of the plurality of analytic software applications, one or more sub-components of the analytic software application, pre-requisites and dependencies of the analytic software application, and location information for the analytic software application; and
an analytic marketplace application to receive a request for the analytic software application from the user, the analytic marketplace application to search for an analytic software application that matches the request using the single file definition to generate a search result and respond to the request according to the search result.

32. The system of claim 31 wherein the single file definition comprises:
attributes of the plurality of analytic software applications according to a standard classification, the attributes corresponding to a complete representation of locatability and descriptors of the analytic software applications, including the sub-components, pre-requisites, and dependencies of the analytic software applications.

33. The system of claim 32 wherein the attributes are represented using an extensible markup language (XML).

34. The system of claim 32 further comprising:
a certification tool to certify the complete representation of the single file definition using a certification tool.

35. The system of claim 34 wherein the requested analytic software application is verified using the certification tool at a user environment.

36. The system of claim 35 wherein the analytic marketplace application allows the user to select the attributes for the analytic software applications.

37. The system of claim 36 wherein the centralized analytic marketplace further comprises:
a repository that contains an existing application that matches the selected attributes.

38. The system of claim 37 wherein the analytic marketplace application delivers the existing application to the user as a local copy.

39. The system of claim 37 wherein the centralized analytic marketplace further comprising:
a security measure to provide security to the repository.

40. The system of claim 36 wherein the centralized analytic marketplace further comprises:
a knowledge base that stores a vendor application that matches the selected attributes, the knowledge base including vendor information of a vendor supplying the vendor application, and a record of users or organizations accessing the application from the centralized analytic marketplace.

41. The system of claim 40 wherein the analytic marketplace application delivers the vendor information to the user.

42. The system of claim 41 wherein the centralized analytic marketplace keeps track of the delivered existing application, informs the user of an update if the delivered existing application becomes obsolete, and informs the user if the delivered existing application is determined to have an error.

43. The system of claim 31 wherein the centralized analytic marketplace further comprises:
an alternate application database that stores a similar application that has attributes similar to the selected attributes, the alternate application database having an alternate definition file of the similar application.

44. The system of claim 43 wherein the analytic marketplace application delivers the alternate definition file to the user.

45. The system of claim 31 wherein the user session occurs by using one of a web service, a hypertext transfer protocol (HTTP) request, and an application program interface (API).

* * * * *